Aug. 21, 1934.  R. J. WISE  1,971,148
SIGNAL DISTORTION INDICATOR FOR START-STOP TELEGRAPH SYSTEMS
Filed Aug. 16, 1932
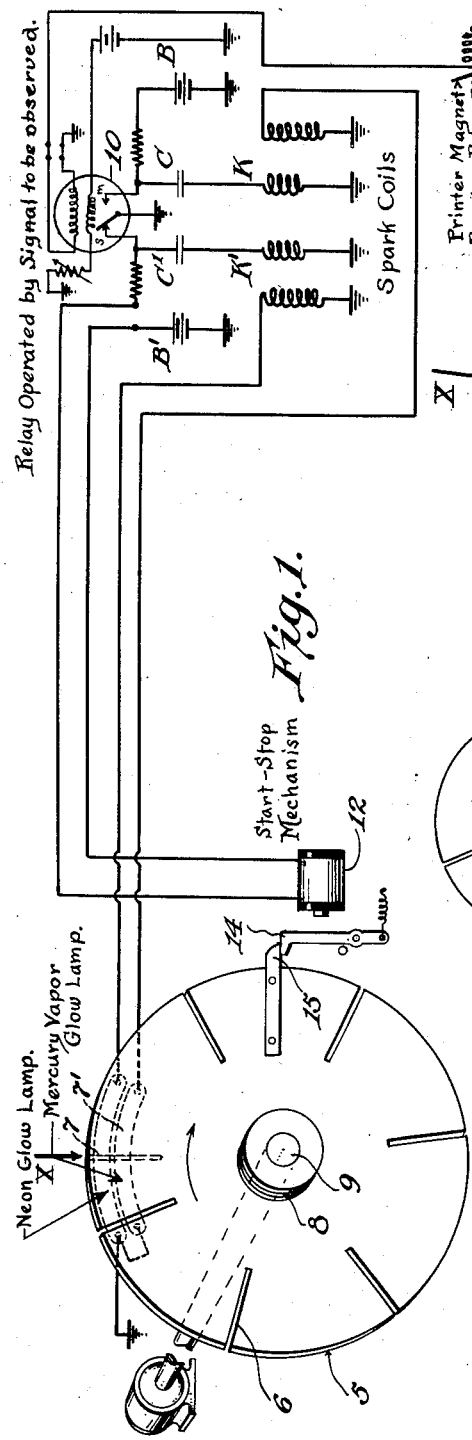
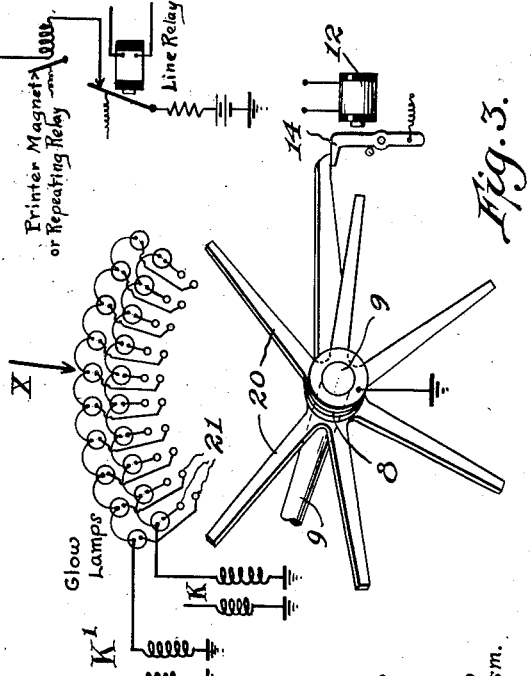
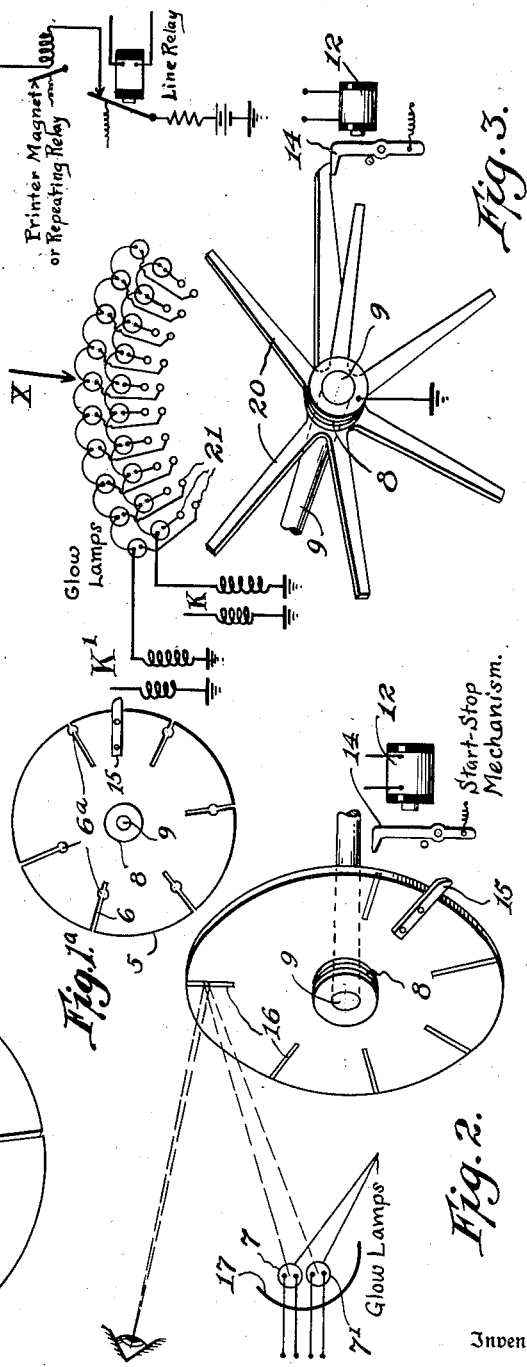
Inventor
R. J. Wise
By Eugene C. Brown
Attorney Patented Aug. 21, 1934

1,971,148

UNITED STATES PATENT OFFICE

1,971,148

SIGNAL DISTORTION INDICATOR FOR START-STOP TELEGRAPH SYSTEMS

Raleigh J. Wise, Plainfield, N. J., assignor to The Western Union Telegraph Company, New York, N. Y., a corporation of New York Application August 16, 1932, Serial No. 629,067

5 Claims. (Cl. 178—69)

My invention relates to apparatus for indicating the character and magnitude of signal distortion in telegraph systems and is particularly intended for use in start-stop systems.

In systems of this kind the telegraph signals are usually received from the line by means of a relay. At terminal stations the line relays repeat the signals to printers connected in their respective local circuits. The relative lengths of the received "marking" and "spacing" signals are affected by changes in line conditions such as leakage variations resulting from weather changes, induced potentials, earth potentials, etc. The signals can be restored to normal proportions by readjusting the receiving relay or by readjusting the operating current.

It is customary to observe closely the printing of incoming messages for errors and when an error is seen which indicates that line conditions have changed and readjustments are necessary the circuit is interrupted and the distant station transmits a rhythmic signal. The signal is observed on a meter connected in the local receiving circuit and used as a guide in making the necessary readjustments. Such procedure is wasteful of line time and hazardous to telegraphic accuracy. It is very desirable to correct the adjustment of the receiving instrument before line conditions change enough to cause printer errors.

The purpose of my invention is to provide a signal bias and distortion indicating means which can be applied to a circuit while telegraph messages are being received over the circuit. By means of my invention the operating margin of a circuit can be observed and corrections can be made in the adjustment of the instruments without disturbing the normal operation of the circuit.

I employ a scanning disc, such as that employed in a stroboscope, which is rotated in synchronism with the transmitted signal impulses. The disc is provided with radial slots which pass in front of a pair of glow lamps of different colors and which are flashed momentarily upon the reception of marking or spacing signal impulses. By observing the position of the slots with respect to a datum line as they are illuminated by the lamps, it is evident that the departure from the normal position will indicate the direction and amount of the signal distortion.

My invention will be clearly understood from the following description when considered in connection with the accompanying drawing and its scope will be pointed out in the appended claims.

Figure 1 illustrates diagrammatically one embodiment of my invention; Figure 1ª shows a modification of the scanning disk; and Figures 2 and 3 show modifications thereof.

Referring to Fig. 1, the scanning disc 5 is provided with radial slots 6, spaced to conform with the units of the telegraph code, each unit or code character consisting of a uniform number, usually five, of impulses of different combinations of marking and spacing signals. Two glow lamps, preferably of elongated arcuate tubular shape, emitting light of different color respectively, are positioned behind the disc so that the flashes of light will appear through the slots as they pass in front of the tubes. One lamp is flashed momentarily upon the reception of a spacing signal and the other upon the reception of a marking signal. The lamps 7, 7' are preferably of the negative glow type, one being a neon glow lamp and the other a mercury vapor glow lamp.

The scanning disc 5 is mounted through a friction clutch 8 upon the shaft 9 of a small constant speed motor or a small self-starting synchronous motor, not shown, driven from the contacts of a tuning fork in synchronism with the signals.

The relay 10 is connected to a telegraph circuit over which are received the signals to be observed. The marking and spacing contacts of the relay are connected to one pole of the separate grounded batteries B, B', and through condensers C, C' to the primary windings of spark coils K, K'. The start magnet 12 of the start-stop mechanism is connected to the spacing contact of the relay. The secondary windings of the spark coils are connected respectively to the glow lamps 7, 7'.

The operation of my signal distortion indicator will be readily understood from the above detailed description of the various parts of the apparatus. When the apparatus is in the "rest" position, as indicated in Figure 1, the tongue of the relay 10 is held against the marking contact m and condenser C' will receive a charge from battery B'. The first signal impulse of each character is the spacing start pulse which causes the relay tongue to engage its spacing contact thereby energizing the start magnet 12 which withdraws the catch 14 from the stop 15, permitting the scanning disc 5 to rotate. During this interval condenser C is charged from the battery B. The next impulse is marking, causing the relay tongue to engage the marking contact, thereby discharging the condenser C through the relay tongue and primary winding of sparking coil K. The high secondary voltage induced in the secondary winding of the spark coil produces a momentary flash in the glow tube 7' which is seen through a slot 6 at the position X, if there is no distortion in the signal. Thereafter each movement of the relay tongue and consequently each flash of light from one tube or the other should occur when a slot occupies the position X.

In practice the winding of relay 10 is jacked or connected in series with the telegraph printer in order to observe the signals being received by the printer. The relay 10 is given a predetermined adjustment which insures that the printer is receiving unbiased signals when the indicator shows the signals to be unbiased. The adjustment of relay 10 then remains fixed while observations and corrections are being made. Any bias observed is corrected by adjusting the line relay which repeats the signals into the receiving circuit. Similarly the relay 10 may be given a predetermined adjustment suitable for operation in a circuit with a repeating relay instead of a printer. The flashes of the different colors representing marking and spacing signals will appear in juxtaposition at X if the receiving relay is properly adjusted. Any angular displacement in the flashes from the two lamps indicates a bias in one direction or the other. That is, the relative lengths of the marking and spacing signals are not correct and it will be necessary to readjust the bias of the line relay.

The failure of the lights to appear repeatedly at the normal position X indicates signal distortion to the extent of the scattering of the light flashes. A preponderance of light flashes to the right or left of the normal position X indicates differences in the speeds of the driving motors at the sending and receiving ends of the line. This may also be indicated by a systematic scattering of the light flashes.

Unbiased signals are obtained when the line relay is so adjusted that the light flashes from the two lamps occupy the same angle regardless of the other forms of distortion or the normal position X. My signal distortion indicator is therefore useful in maintaining the adjustments of single line relays during variable line leakage.

Instead of viewing the lamps through slots in the stroboscope disc, I may arrange a series of narrow mirror surfaces 16 on the disc and position the two glow lamps with an associated reflector 17 in front of the disc as shown in Fig. 2, so that the flashes of light will be reflected to the eye of the observer by the mirrors. The effect, of course, is quite similar to the arrangement of Figure 1.

In order to readily identify the respective pulses the slots may be provided with small apertures 6ª arranged spirally around the disk in the manner indicated in Fig. 1ª.

I have shown a modification in Figure 3 wherein a series of revolving contact arms or electrodes 20 are employed to distribute the high potential from the secondary windings of the spark coils to a series of small glow lamps arranged in pairs as shown. As the electrode arms pass over the switch points 21 a lamp from one group or the other will flash at the instant of discharge from one spark coil or the other in accordance with the marking or spacing signals, indicating a bias or signal distortion in the same manner as previously described for the arrangement of Figure 1.

In the above description I have referred only to single current operation and have shown that this device provides a means for readily maintaining the adjustment of single line relays to meet line conditions during changeable weather without interrupting the normal operation of the circuits. It will be evident that the same device can be used for detecting bias or distortion on polar circuits. By reason of the start-stop mechanism for maintaining synchronism the indication of signal distortion or a bias in the receiving relay is rendered exceedingly accurate, speed errors being practically eliminated.

I claim:

1. A signal distortion indicator for a telegraph system comprising a relay responsive to periodic signals of marking and spacing character, a plurality of juxtaposed gaseous conduction lamps, a stroboscopic scanning disc provided with slots adapted to register successively with a datum line when passing in front of said lamps, a continuously operating motor for rotating said disc in substantial synchronism with the signal impulses, start-stop means controlled by said relay for releasing said disc and means controlled by said relay for momentarily flashing one or the other of said lamps with each change in polarity of said signals.

2. A signal distortion indicator for a telegraph system comprising a relay responsive to periodic signals of marking and spacing character, a plurality of juxtaposed gaseous conduction lamps, a constant speed motor, a scanning disc frictionally mounted upon the shaft of said motor and provided with sighting elements for observing flashes from said lamps, said sighting elements being spaced apart at intervals such that they successively pass in front of said lamps in synchronism with the signal impulses, a start-stop device adapted to arrest said disc after each revolution and being released under the control of said relay and means under the control of said relay for flashing one or the other of said lamps at each initial change in polarity of said signals.

3. A signal distortion indicator for a telegraph system comprising a receiving device responsive to periodic signals of marking and spacing character, a plurality of juxtaposed gaseous conduction lamps, a constant speed motor, a scanning device frictionally driven by said motor and provided with sighting elements for observing flashes from said lamps, a stop device operating to arrest said scanning device after each cyclic movement thereof, means controlled by a signal impulse to withdraw said stop device, and means controlled by said receiving device to flash one or the other of said lamps with each change in polarity of said signals.

4. In a signal distortion indicator for a telegraph system, the combination with a source of uniform code character signals composed of marking and spacing impulses, of a plurality of juxtaposed gaseous conduction lamps, a rotary scanning device frictionally driven from a constant speed motor and having sighting elements for observing flashes from said lamps, said elements being so disposed that they successively pass in front of the lamps at intervals corresponding with the impulses of the code characters, a stop device operating to arrest said disc after each revolution, means controlled by a signal impulse to withdraw said stop device, and means controlled by the signal impulses for flashing one or the other of said lamps depending upon the marking or spacing characteristic of the impulse.

5. In a signal distortion indicator for a telegraph system, the combination with a source of uniform code character signals composed of marking and spacing impulses, of a relay responsive to said signals, a plurality of juxtaposed gaseous conduction lamps, a rotary scanning device frictionally driven from a constant speed source and provided with sighting elements for observing flashes from said lamps, said elements being so disposed that they successively pass in front of the lamps at intervals corresponding with the reception of the code characters, a stop device operating to arrest said disc after each revolution, means controlled by a signal impulse to withdraw said stop device, and means controlled by said relay to flash one or the other of said lamps with each change in polarity of said signals.

RALEIGH J. WISE.